(12) United States Patent
Takashima et al.

(10) Patent No.: US 9,083,470 B2
(45) Date of Patent: Jul. 14, 2015

(54) OPTICAL RECEIVER

(75) Inventors: Shigehiro Takashima, Tokorozawa (JP);
Mitsuo Akashi, Fujisawa (JP);
Yoshikazu Era, Yokohama (JP); Atsushi Takai, Koganei (JP)

(73) Assignee: Oclaro Japan, Inc., Kanagawa (JP)

( * ) Notice: Subject to any disclaimer, the term of this patent is extended or adjusted under 35 U.S.C. 154(b) by 712 days.

(21) Appl. No.: 13/354,620

(22) Filed: Jan. 20, 2012

(65) Prior Publication Data

US 2012/0189299 A1 Jul. 26, 2012

(30) Foreign Application Priority Data

Jan. 26, 2011 (JP) ................... 2011-013717

(51) Int. Cl.
*H04B 10/00* (2013.01)
*H04B 10/60* (2013.01)
*H04B 10/69* (2013.01)
*H04B 10/61* (2013.01)

(52) U.S. Cl.
CPC .............. *H04B 10/613* (2013.01); *H04B 10/69* (2013.01)

(58) Field of Classification Search
None
See application file for complete search history.

(56) References Cited

U.S. PATENT DOCUMENTS

2006/0193640 A1 8/2006 Katagiri et al.
2008/0019463 A1 1/2008 Ikeuchi et al.

FOREIGN PATENT DOCUMENTS

JP 2006-270909 A 10/2006
JP 2008-028559 A 2/2008

OTHER PUBLICATIONS

"10 Gb/s Optical Differential Quadrature Phase Shift Key (DQPSK) Transmission using GaAs/AlGaAs Integration", Proc. OFC 2002, Anaheim, CA, 2002 Postdeadline Paper, FD 6-1 to FD 6-3, R.A. Griffen et al.
"Linear and Nonlinear Performance of 42.7-Gb/s Single-Polarization RZ-DQPSK Format", IEEE Photonics Technology Letters, 2006, vol. 18, No. 7, Gnauk et al, pp. 883-885.

*Primary Examiner* — Darren E Wolf
(74) *Attorney, Agent, or Firm* — Mattingly & Malur, PC

(57) ABSTRACT

In pattern synchronization for correctly regenerating received data, which is performed in an optical receiver for receiving an optical signal that has been subjected to quadrature phase modulation, signal conduction is quickly established without using duplicate combinations of bit shifting and pattern changing. A control method that does not involve verifying the duplicate combinations generated in modulation formats and pattern synchronization search orders. Specifically, a signal check circuit (40) performs data verification of data multiplexed by a MUX circuit (38) for multiplexing two data strings, and a bit shift pattern change control circuit (41) controls a bit shift circuit (36) and a pattern changing circuit (37) based on a result of the data verification and detects a correct combination of correct regenerated data to establish the signal conduction. At this time, for the bit shift circuit (36) and the pattern changing circuit (37), the duplicate combinations are not verified.

4 Claims, 11 Drawing Sheets

FIG.2

| I LANE | 1 | 3 | 5 | 7 | 9 | | |
|---|---|---|---|---|---|---|---|
| Q LANE | 2 | 4 | 6 | 8 | 10 | | |

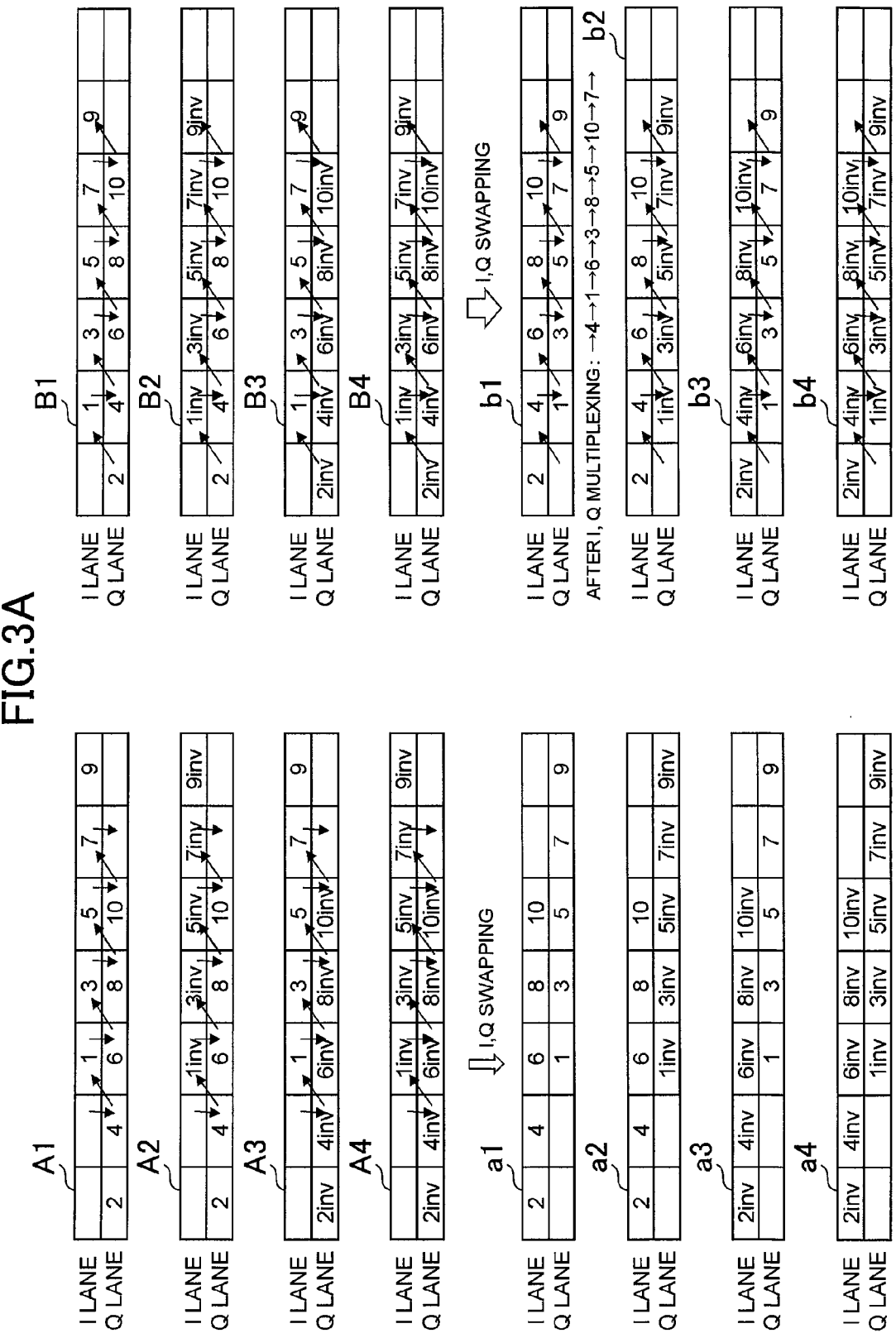

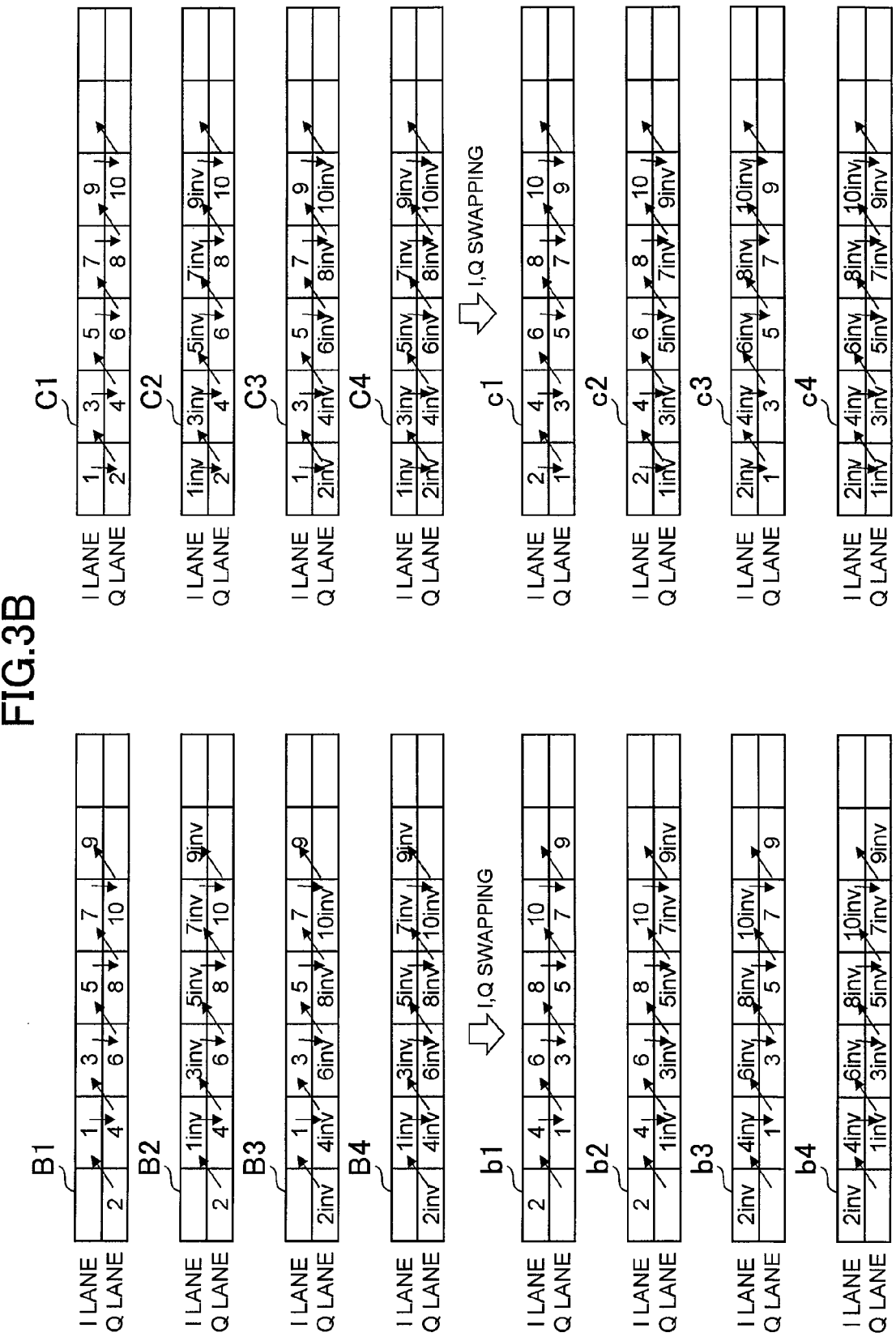

FIG.4A
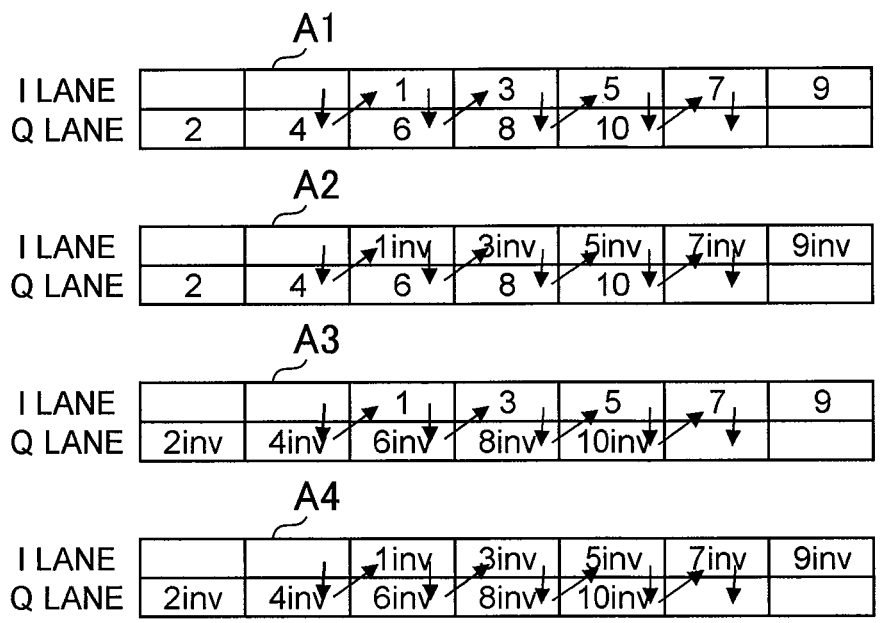
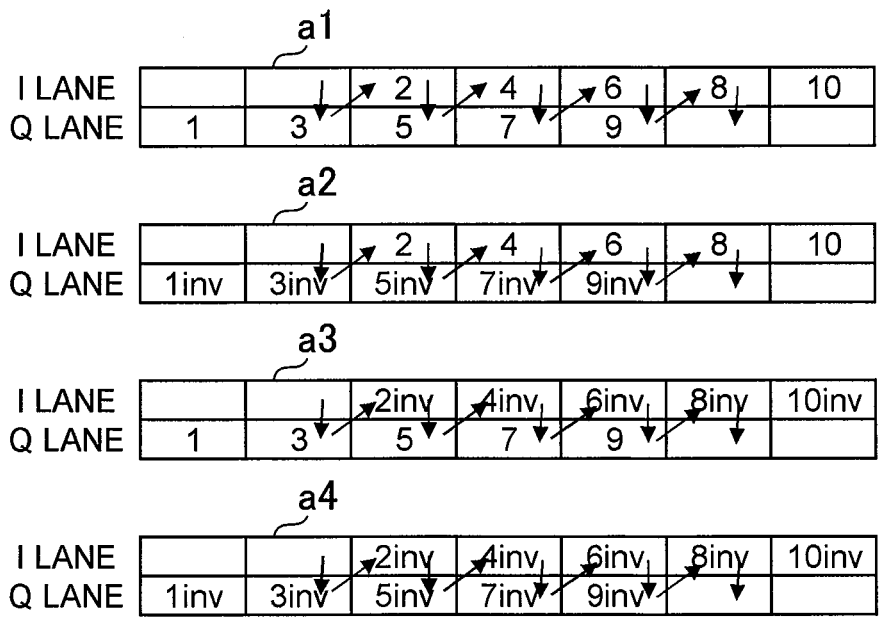

FIG.4B
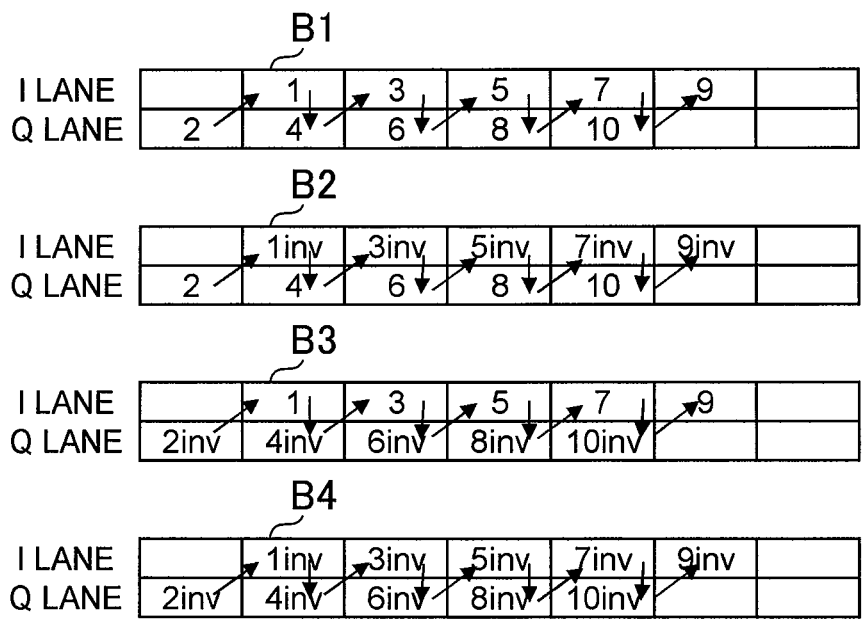
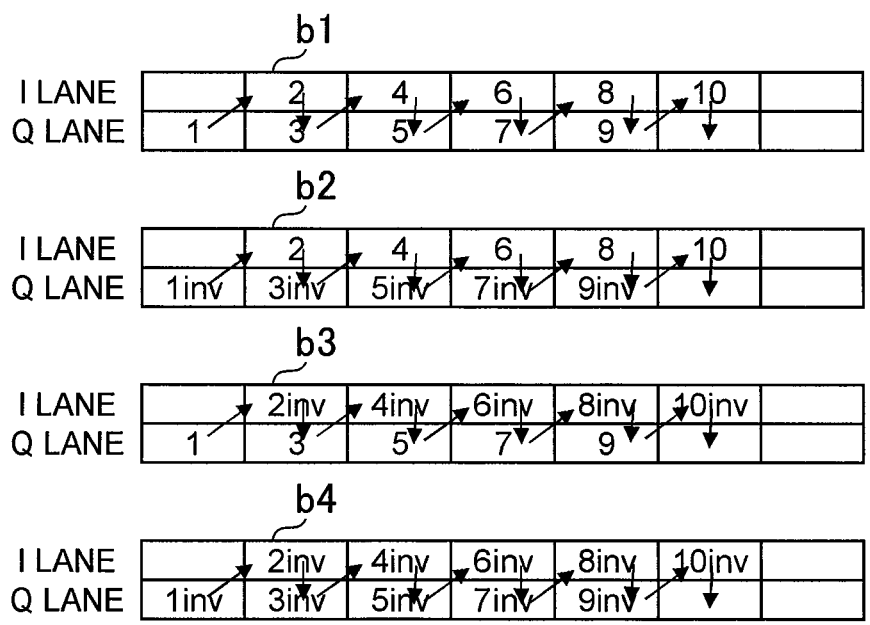

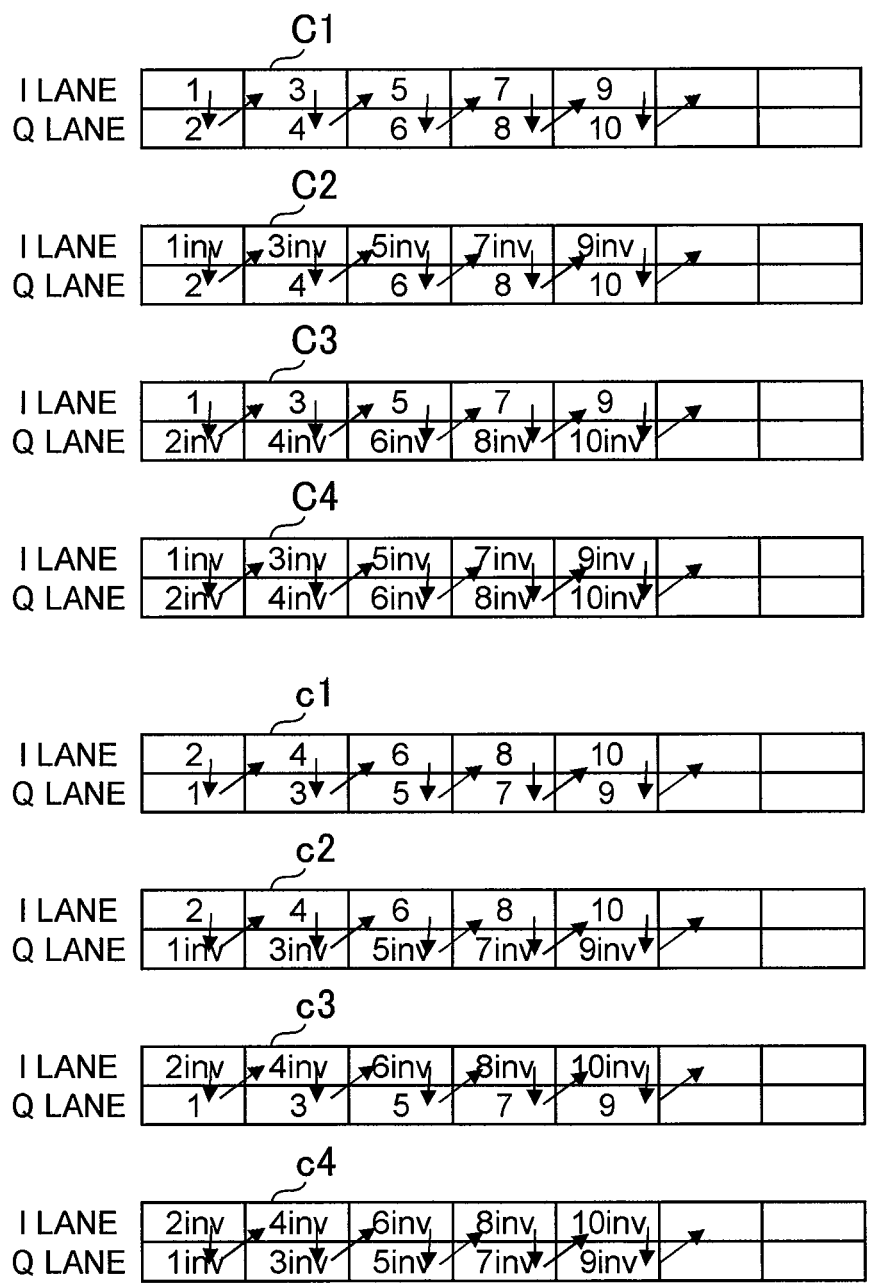

FIG.4E

E1
| I LANE | 1 | 3 | 5 | 7 | 9 | | |
|---|---|---|---|---|---|---|---|
| Q LANE | | | 2 | 4 | 6 | 8 | 10 |

E2
| I LANE | 1inv | 3inv | 5inv | 7inv | 9inv | | |
|---|---|---|---|---|---|---|---|
| Q LANE | | | 2 | 4 | 6 | 8 | 10 |

E3
| I LANE | 1 | 3 | 5 | 7 | 9 | | |
|---|---|---|---|---|---|---|---|
| Q LANE | | | 2inv | 4inv | 6inv | 8inv | 10inv |

E4
| I LANE | 1inv | 3inv | 5inv | 7inv | 9inv | | |
|---|---|---|---|---|---|---|---|
| Q LANE | | | 2inv | 4inv | 6inv | 8inv | 10inv | e1
| I LANE | 2 | 4 | 6 | 8 | 10 | | |
|---|---|---|---|---|---|---|---|
| Q LANE | | | 1 | 3 | 5 | 7 | 9 | e2
| I LANE | 2 | 4 | 6 | 8 | 10 | | |
|---|---|---|---|---|---|---|---|
| Q LANE | | | 1inv | 3inv | 5inv | 7inv | 9inv | e3
| I LANE | 2inv | 4inv | 6inv | 8inv | 10inv | | |
|---|---|---|---|---|---|---|---|
| Q LANE | | | 1 | 3 | 5 | 7 | 9 | e4
| I LANE | 2inv | 4inv | 6inv | 8inv | 10inv | | |
|---|---|---|---|---|---|---|---|
| Q LANE | | | 1inv | 3inv | 5inv | 7inv | 9inv |

US 9,083,470 B2

OPTICAL RECEIVER

CROSS-REFERENCE TO RELATED APPLICATION

The present application claims priority from Japanese application JP 2011-013717 filed on Jan. 26, 2011, the content of which is hereby incorporated by reference into this application.

BACKGROUND OF THE INVENTION

1. Field of the Invention

The present invention relates to an optical receiver used in optical communication, and more particularly, to an optical receiver capable of quickly establishing signal conduction in phase-modulated optical transmission.

2. Description of the Related Art

In recent years, in a wavelength multiplexing optical transmission system, in order to increase a transmission rate per channel while maintaining a wavelength interval between channels, it has been a challenge to increase a frequency utilization efficiency. Therefore, researches are being made to employ, instead of on-off keying (OOK) which have conventionally been used widely, a modulation format such as quadrature phase shift keying (QPSK) that provides narrow occupied bandwidth and high frequency utilization efficiency, for example.

Further, in the field of optical transmission, from the viewpoints of easy demodulation and optical fiber transmission characteristics, a return-to-zero differential quadrature phase shift keying (RZ-DQPSK) modulation format in which the QPSK modulation signal is differentially encoded and then RZ encoded is expected to be employed widely, for example.

As an example, in an optical receiver of the RZ-DQPSK modulation format, a delay interferometer (DLI) and a dual balanced receiver are used to add two quadrature phase components of received light waves with a delay of 1 time slot and then convert the added components to electric signals in two lanes that are proportional to amplitudes of the components for quadrature phase demodulation. Further, in order to regenerate one original data signal from the two electric signals, establishment of orthogonality of two lanes of the DLI and establishment of pattern matching (polarity inversion and lane swapping) of data signals associated with multilevel phase modulation of DQPSK are needed. Examples of the synchronization methods include methods disclosed in JP 2006-270909 A.

SUMMARY OF THE INVENTION

Of the orthogonality and the pattern matching described above, in order to establish the pattern matching, it is necessary to multiplex data strings in two lanes back to one data string, and then to judge whether or not the content of the data string is correct. At this time, in order to multiplex the data strings in the two lanes in synchronized timing, the two electric signals regenerated by a demodulator need to be subjected to clock extraction, identification, and regeneration by using clock data recovery (CDR) circuits, and then to synchronization and multiplexing. At this time, the two electric signals are originally generated from one input signal and hence have the same data rate. However, phases of the electric signals are skewed and fluctuate due to disturbances that occur in the modulator/demodulator and a transmission line. In order to reduce the effects of the phase fluctuation on the transmission characteristics, it is necessary to subject the two electric signals once to the clock extraction, identification, and regeneration by the CDR circuits that operate independently of each other, and then to perform synchronization and multiplexing based on one of the clocks.

At this time, the skew fluctuation between the two electric signals described above and the phase fluctuation of clock recovery circuits of the two CDR circuits can be absorbed by a synchronization circuit. However, in that case, the skew between the electric signals and the skew between the recovered clocks of the two CDR circuits at the time point when the synchronization is fixed lead to certain bit shifts in the two synchronized lanes and affect the arrangement of output data after multiplexing. Therefore, pattern matching needs to be set so that the bit shift between data lanes, the lane swapping, and the polarity inversion are performed while monitoring the polarity inversion and lane swapping described above as well as the contents of the multiplexed data strings, to thereby realize a combination that regenerates the correct data string.

The bit shift amount is determined by performances of the modulator and the demodulator and configurations of the two CDR circuits, and also changes due to the fluctuations in the performances as well as configurations and variations in the operation environment. Therefore, depending on the conditions, the number of combinations that need to be verified is increased. Further, in a receiving circuit having a configuration in which data strings regenerated by the two CDR circuits are further parallelized, and then the synchronization and the pattern matching are performed, the bit shift accompanying the parallelization may also be generated, with the result that the number of combinations that need to be verified at the time of the pattern matching is further increased.

As described above, in order to multiplex the data strings regenerated by at least two independent CDR circuits, to thereby quickly establish the conduction of the clock recovery signal, the important issue is to reduce the number of combinations that need to be verified for pattern matching that can regenerate the correct data string.

It is an object of the present invention to provide an optical receiver capable of quickly establishing the signal conduction in a case where the signal conduction is to be established by multiplexing at least two data strings regenerated from the optical signal that has been subjected to quadrature phase modulation.

In order to solve the above-mentioned problem, it is necessary to omit combinations that provide the same effect on the arrangement and the polarity of the multiplexed data strings, of combinations of the bit shift, the lane swapping, and the polarity inversion in verifying the pattern matching, and to monitor whether the multiplexed data string is regenerated correctly. Therefore, in order to solve the above-mentioned problem, according to the present invention, there is provided an optical receiver for receiving an optical signal that has been subjected to quadrature phase modulation, including: at least two independent CDR circuits for extracting clock and identifying and regenerating data from a regenerated electric signal; a synchronization circuit for synchronizing outputs of the at least two independent CDR circuits; a bit shift circuit; a pattern changing circuit having a lane swapping function and a polarity inversion function; a multiplexing circuit for multiplexing at least two data strings; a signal check circuit for performing data verification of multiplexed data; and a bit shift pattern change control circuit having functions of controlling the bit shift circuit and the pattern changing circuit based on a result of the data verification, detecting a correct combination of correct regenerated data, and establishing signal conduction, wherein the bit shift pattern change control circuit controls so as to omit the data verification of overlapping data among the multiplexed data.

As an example, at least two electric signals regenerated from the optical signal that has been subjected to the quadrature phase modulation are input to the at least two independent CDR circuits, respectively. The at least two of first data strings output from the at least two independent CDR circuits, respectively, are input to the synchronization circuit. The at least two of second data strings output from the synchronization circuit are input to a circuit including the bit shift circuit and the pattern changing circuit to perform bit shifting of data strings. The multiplexing circuit multiplexes the at least two of third data strings output via the circuit. The bit shift pattern change control circuit repeatedly changes control contents of the bit shift circuit and the pattern changing circuit until the result of the data verification becomes a predetermined result, and detects the correct combination of the correct regenerated data to establish the signal conduction. Specifically, when multiplexed data in a case where the bit shift circuit and the pattern changing circuit are controlled with a first control content and multiplexed data in a case where the bit shift circuit and the pattern changing circuit are controlled with a second control content are the same, the bit shift pattern change control circuit controls the bit shift circuit and the pattern changing circuit with one of the first control content and the second control content.

Further, according to an aspect of the present invention, the bit shift pattern change control circuit may control so as to verify data which consist of the bit shift of the multiplexed data, the polarity inversion of the multiplexed data, and the bit shift and the polarity inversion of the multiplexed data. Further, according to an aspect of the present invention, the bit shift circuit may be provided in a preceding stage of the pattern changing circuit, and the bit shift pattern change control circuit may control so as to verify one of an odd number of bits and an even number of bits among the multiplexed data. As an example, the at least two independent CDR circuits include two CDR circuits. Two electric signals regenerated from the optical signal that has been subjected to the quadrature phase modulation are input to the two CDR circuits, respectively. Two of first data strings output from the two CDR circuits, respectively, are input to the synchronization circuit. Two of second data strings output from the synchronization circuit are input to a circuit including the bit shift circuit to perform bit shifting of one data string of the two of second data strings output from the synchronization circuit and the pattern changing circuit, respectively, The multiplexing circuit multiplexes two of third data strings output via the circuit. The bit shift pattern change control circuit controls the bit shift circuit to set a bit shift amount used in performing the bit shifting of the one data string to one of an even number of bits and an odd number of bits, and repeatedly changes control contents of the bit shift circuit and the pattern changing circuit until the result of the data verification becomes a predetermined result, and detects the correct combination of the correct regenerated data to establish the signal conduction.

According to the present invention, it is possible to reduce the number of combinations of pattern matching that are needed when the at least two data strings, which are regenerated from the optical signal that has been subjected to quadrature phase modulation by using, for example, the DLI, the dual balanced receiver, and the at least two CDR circuits that operate independently of each other, are multiplexed to regenerate one original data string, to thereby quickly establish the signal conduction.

The combinations that provide the same effect are determined by the signal modulation format. The combinations that provide the same effect change also depending on the order of the bit shifting, the lane swapping, and the polarity inversion, but the number of combinations which duplicate and need no verification is the same for the maximum range of bit shift which is verified for the pattern matching. Further, the same effects may be obtained in the optical receiver for regenerating, in the optical communication not only of the RZ-DQPSK modulation format described above but also of a modulation format using the quadrature phase modulation such as QPSK, the electric signals using the at least two CDR circuits that operate independently of each other.

BRIEF DESCRIPTION OF THE DRAWINGS

In the accompanying drawings:
FIG. 2 is a diagram illustrating an example of an I data string and a Q data string;
FIG. 3A is a diagram illustrating changes of the I data string and the Q data string;
FIG. 3B is a diagram illustrating changes of the I data string and the Q data string;
FIG. 4A is a diagram illustrating changes of the I data string and the Q data string;
FIG. 4B is a diagram illustrating changes of the I data string and the Q data string;
FIG. 4C is a diagram illustrating changes of the I data string and the Q data string;
FIG. 4E is a diagram illustrating changes of the I data string and the Q data string.

DETAILED DESCRIPTION OF THE INVENTION

Hereinafter, an embodiment of the present invention is described with reference to the accompanying drawings. The embodiment described below uses the RZ-DQPSK format.

Figure 1:
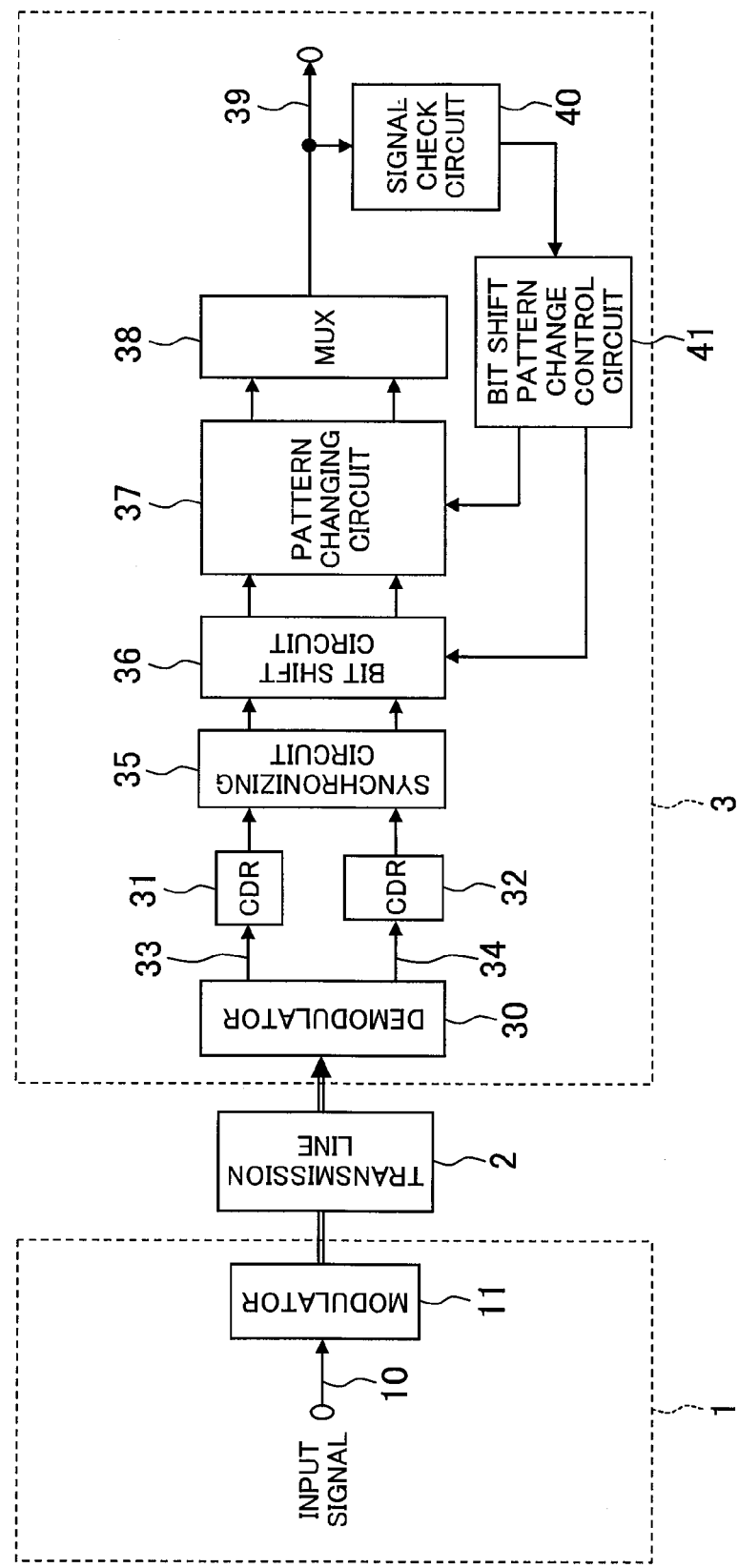
FIG. 1 is a block diagram illustrating a configuration of an optical receiver according to the present invention.

FIG. 1 is a diagram illustrating an example of a configuration according to the embodiment of the present invention, and is a block diagram illustrating a configuration of an optical receiver 3 according to the embodiment of the present invention. On an optical transmitter 1 side, an input signal 10 is converted by a modulator 11 into an RZ-DQPSK optical signal, and the RZ-DQPSK optical signal is input through a transmission line 2 to a demodulator 30 of the optical receiver 3. Specifically, the modulator 11, which is an RZ-DQPSK modulator, performs RZ-DQPSK modulation to convert the input signal 10 into the RZ-DQPSK optical signal, and the RZ-DQPSK optical signal is input through the transmission line 2 to the demodulator 30. In the demodulator 30, the RZ-DQPSK optical signal is subjected to quadrature phase demodulation to be converted to electric signals in two lanes. Specifically, in the demodulator 30, the RZ-DQPSK optical signal is converted to an electric signal in an I lane 33 and an electric signal in a Q lane 34. The two electric signals in the I lane 33 and the Q lane 34 are input to two clock data recovery circuits 31 and 32 (hereinafter, referred to as CDR circuits 31 and 32) that operate independently of each other, respectively, to be regenerated as two data strings. A synchronizing circuit 35 absorbs any skew so that the two data strings become two synchronized parallel data strings (I data string and Q data string to be described later). Thereafter, the two synchronized parallel data strings pass through a bit shift circuit 36 and a pattern changing circuit 37 (polarity inversion and lane swapping) and are restored as one data string 39 by a MUX circuit 38. The bit shift circuit 36 performs bit shifting of at least one parallel data string in accordance with an instruction from a bit shift pattern change control circuit 41 to be described later. In this embodiment, the bit shift circuit 36 performs bit shifting of a parallel data string of the Q lane. Further, the pattern changing circuit 37 subjects at least one of the parallel data strings to the polarity inversion and the lane swapping in accordance with an instruction from the bit shift pattern change control circuit 41.

The restored data string 39 is monitored by a signal check circuit 40 so as to be correctly restored as the original input signal 10 to the transmission side. When the data string is regenerated with a wrong combination of bit shifting and pattern changing, the data string is passed through the bit shift pattern change control circuit 41 so that the bit shifting and the pattern changing are controlled to be changed to another combination, and the regenerated data is verified. The pattern changing is repeated until the regenerated data output finally regenerates the input signal data correctly. Specifically, the signal check circuit 40 repeatedly performs data verification of the restored data string 39 so that the restored data string 39 is restored as the input signal 10. Then, the bit shift pattern change control circuit 41 repeatedly changes the content of the bit shifting and the content of the pattern changing until an affirmative data verification result is obtained. Specifically, the bit shift pattern change control circuit 41 repeatedly changes the control contents of the bit shift circuit 36 and the pattern changing circuit 37 until the signal conduction is established.

At this time, the bit shift pattern change control circuit 41 omits combinations that provide the same effect on the arrangement and the polarity of the data string after being multiplexed by the MUX circuit 38, and gives combinations of the bit shifting and the pattern changing. Specifically, the bit shift pattern change control circuit 41 uses, when there are a plurality of control contents of the bit shift circuit 36 and the pattern changing circuit 37 with which the data array of the restored data string 39 becomes a certain data array, only one control content of the plurality of control contents is used. In other words, when the data string 39 obtained by controlling the bit shift circuit 36 and the pattern changing circuit 37 with a certain control content and the data string 39 obtained by controlling the bit shift circuit 36 and the pattern changing circuit 37 with another control content are the same, the bit shift pattern change control circuit 41 does not perform control of the bit shift circuit 36 and the pattern changing circuit 37 with one of the control contents. This way, the combination that regenerates the correct data string may be found faster, and the signal conduction may be quickly established.

Note that, in this figure, the verification of the data pattern is performed after the MUX circuit 38. However, the multiplexing by the MUX circuit 38 may not be performed and corresponding pattern verification may be performed after multiplexing two data strings.

Figure 2:
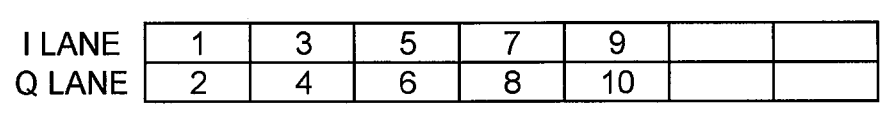

The maximum value of the bit shifting necessary for finding the combination that regenerates the correct data string is determined by the modulation format, the demodulation format, and the amount of skews generated in the modulator, the demodulator, and the CDR circuits. When the two independent CDR circuits 31 and 32 illustrated in this figure are used, the maximum value is about ±2 bits. Changes of the I data string and the Q data string (see FIG. 2) due to the bit shifting and the pattern changing in this case are illustrated in FIGS. 3A to 3D, which are used to describe the same patterns and the pattern checking method. The numerals in the patterns of the figures indicate the arrangement of the input data string. The symbol "inv" after the numerals indicates polarity inversion of the data.

Table A1 of FIG. 3A shows the Q data string and the I data string when the Q data string is shifted by −2 bits, Table A2 of FIG. 3A shows the Q data string and the I data string when the Q data string is shifted by −2 bits and then the polarity of the I data string is inverted, Table A3 of FIG. 3A shows the Q data string and the I data string when the Q data string is shifted by −2 bits and then the polarity of the Q data string is inverted, and Table A4 of FIG. 3A shows the Q data string and the I data string when the Q data string is shifted by −2 bits and then the polarities of both the data strings are inverted. In addition, Table a1 of FIG. 3A shows the Q data string and the I data string when the lane swapping is further performed in the case shown in Table A1 of FIG. 3A, Table a2 of FIG. 3A shows the Q data string and the I data string when the lane swapping is further performed in the case shown in Table A2 of FIG. 3A, Table a3 of FIG. 3A shows the Q data string and the I data string when the lane swapping is further performed in the case shown in Table A3 of FIG. 3A, and Table a4 of FIG. 3A shows the Q data string and the I data string when the lane swapping is further performed in the case shown in Table A4 of FIG. 3A.

Further, Table B1 of FIG. 3A and Table B1 of FIG. 3B show the Q data string and the I data string when the Q data string is shifted by −1 bit, Table B2 of FIG. 3A and Table B2 of FIG. 3B show the Q data string and the I data string when the Q data string is shifted by −1 bit and then the polarity of the I data string is inverted, Table B3 of FIG. 3A and Table B3 of FIG. 3B show the Q data string and the I data string when the Q data string is shifted by −1 bit and then the polarity of the Q data string is inverted, and Table B4 of FIG. 3A and Table B4 of FIG. 3B show the Q data string and the I data string when the Q data string is shifted by −1 bit and then the polarities of both the data strings are inverted. In addition, Table b1 of FIG. 3A and Table b1 of FIG. 3B show the Q data string and the I data string when the lane swapping is further performed in the case shown in Table B1 of FIG. 3A and Table B1 of FIG. 3B, Table b2 of FIG. 3A and Table b2 of FIG. 3B show the Q data string and the I data string when the lane swapping is further performed in the case shown in Table B2 of FIG. 3A and Table B2 of FIG. 3B, Table b3 of FIG. 3A and Table b3 of FIG. 3B show the Q data string and the I data string when the lane swapping is further performed in the case shown in Table B3 of FIG. 3A and Table B3 of FIG. 3B, and Table b4 of FIG. 3A and Table b4 of FIG. 3B show the Q data string and the I data string when the lane swapping is further performed in the case shown in Table B4 of FIG. 3A and Table B4 of FIG. 3B.

Figure 3C:
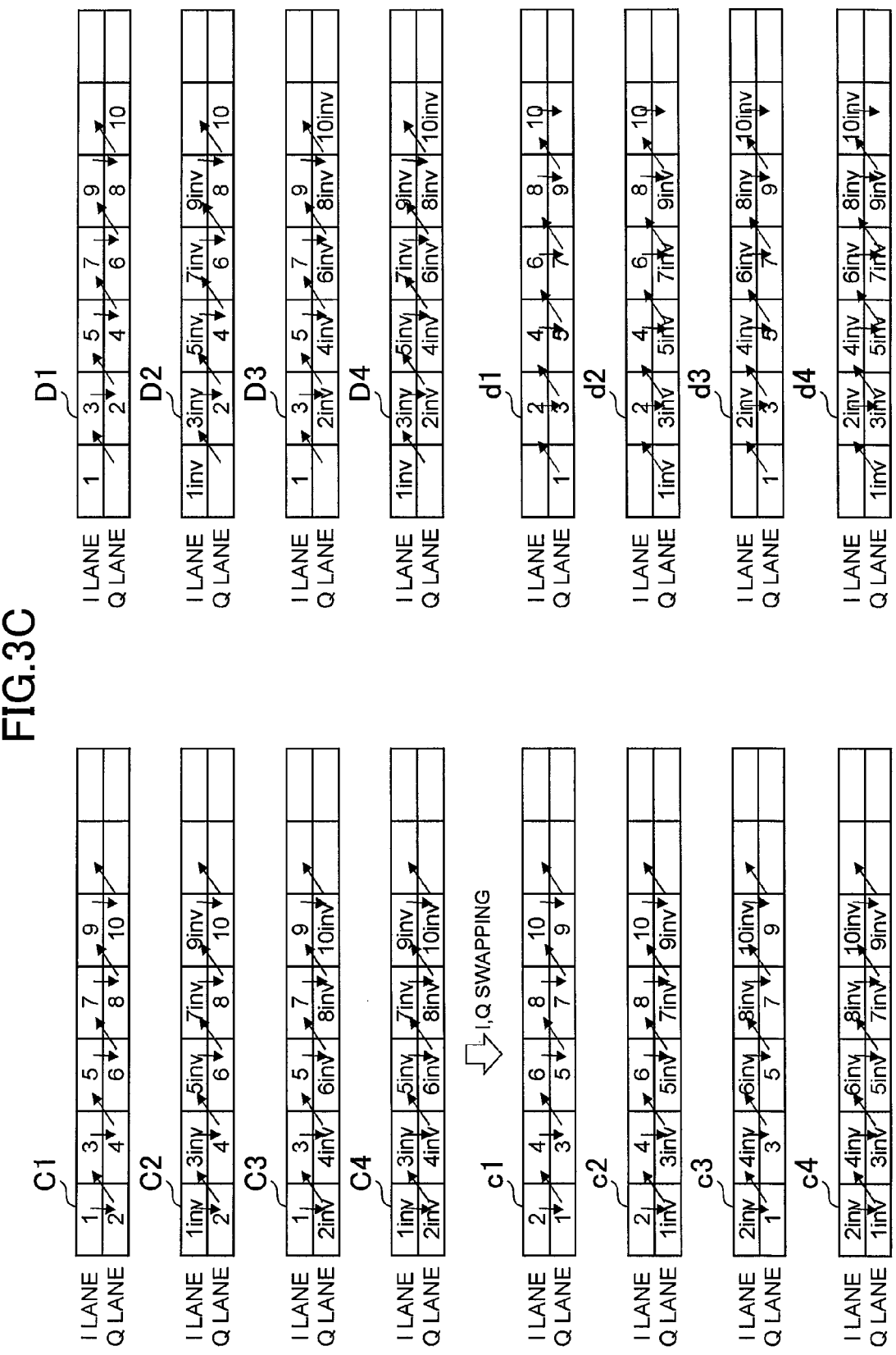
FIG. 3C is a diagram illustrating changes of the I data string and the Q data string.

Further, Table C1 of FIG. 3B and Table C1 of FIG. 3C show the Q data string and the I data string when the Q data string is shifted by 0 bits, Table C2 of FIG. 3B and Table C2 of FIG. 3C show the Q data string and the I data string when the polarity of the I data string is inverted, Table C3 of FIG. 3B and Table C3 of FIG. 3C show the Q data string and the I data string when the polarity of the Q data string is inverted, and Table C4 of FIG. 3B and Table C4 of FIG. 3C show the Q data string and the I data string when the polarities of both the data strings are inverted. In addition, Table c1 of FIG. 3B and Table c1 of FIG. 3C show the Q data string and the I data string when the lane swapping is further performed in the case shown in Table C1 of FIG. 3B and Table C1 of FIG. 3C, Table c2 of FIG. 3B and Table c2 of FIG. 3C show the Q data string and the I data string when the lane swapping is further performed in the case shown in Table C2 of FIG. 3B and Table C2 of FIG. 3C, Table c3 of FIG. 3B and Table c3 of FIG. 3C show the Q data string and the I data string when the lane swapping is further performed in the case shown in Table C3 of FIG. 3B and Table C3 of FIG. 3C, and Table c4 of FIG. 3B and Table c4 of FIG. 3C show the Q data string and the I data string when the lane swapping is further performed in the case shown in Table C4 of FIG. 3B and Table C4 of FIG. 3C.

Figure 3D:
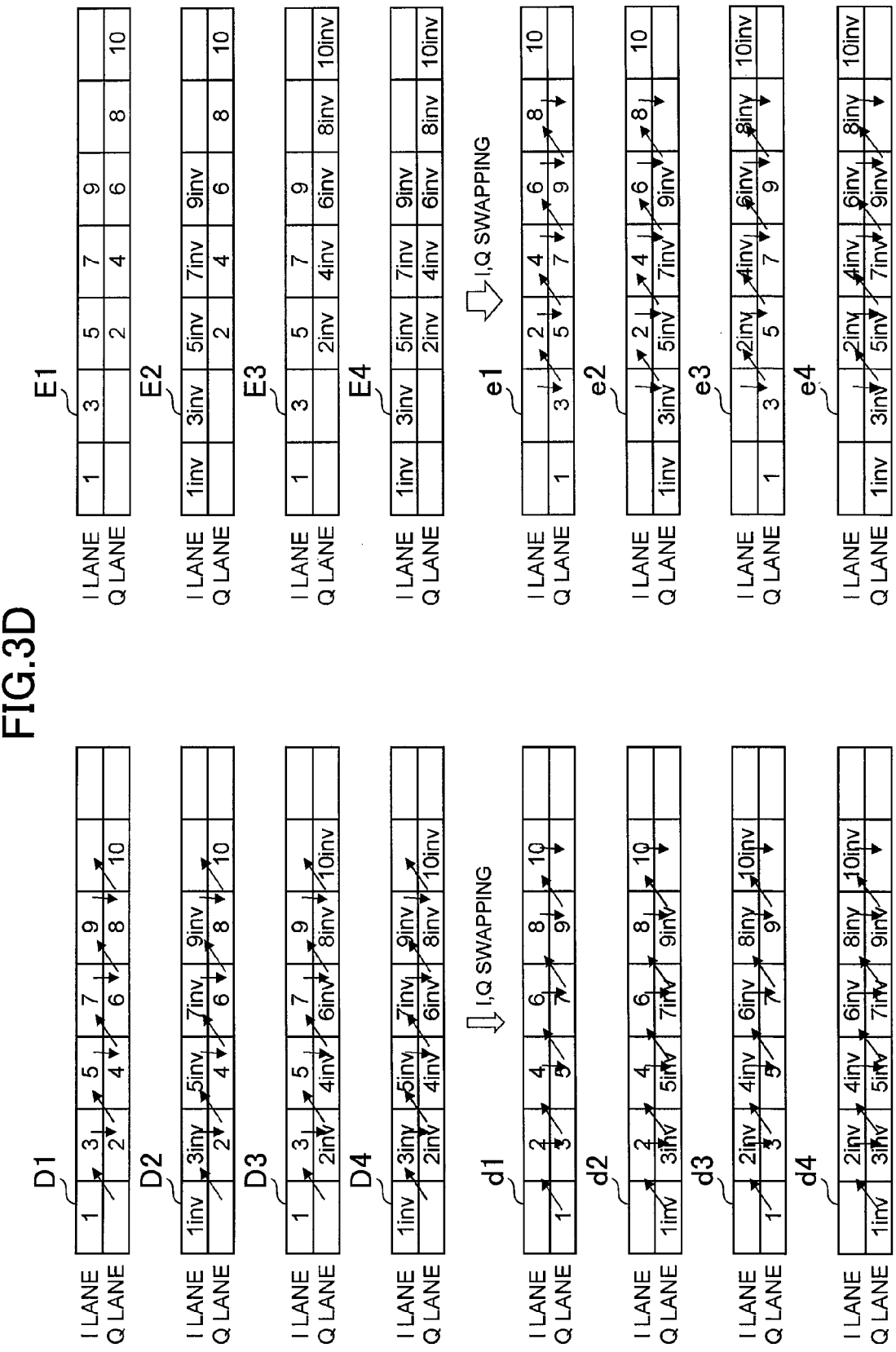
FIG. 3D is a diagram illustrating changes of the I data string and the Q data string.

Further, Table D1 of FIG. 3C and Table D1 of FIG. 3D show the Q data string and the I data string when the Q data string is shifted by +1 bit, Table D2 of FIG. 3C and Table D2 of FIG. 3D show the Q data string and the I data string when the Q data string is shifted by +1 bit and then the polarity of the I data string is inverted, Table D3 of FIG. 3C and Table D3 of FIG. 3D show the Q data string and the I data string when the Q data string is shifted by +1 bit and then the polarity of the Q data string is inverted, and Table D4 of FIG. 3C and Table D4 of FIG. 3D show the Q data string and the I data string when the Q data string is shifted by +1 bit and then the polarities of both the data strings are inverted. In addition, Table d1 of FIG. 3C and Table d1 of FIG. 3D show the Q data string and the I data string when the lane swapping is further performed in the case shown in Table D1 of FIG. 3C and Table D1 of FIG. 3D, Table d2 of FIG. 3C and Table d2 of FIG. 3D show the Q data string and the I data string when the lane swapping is further performed in the case shown in Table D2 of FIG. 3C and Table D2 of FIG. 3D, Table d3 of FIG. 3C and Table d3 of FIG. 3D show the Q data string and the I data string when the lane swapping is further performed in the case shown in Table D3 of FIG. 3C and Table D3 of FIG. 3D, and Table d4 of FIG. 3C and Table d4 of FIG. 3D show the Q data string and the I data string when the lane swapping is further performed in the case shown in Table D4 of FIG. 3C and Table D4 of FIG. 3D.

Table E1 of FIG. 3D shows the Q data string and the I data string when the Q data string is shifted by +2 bits, Table E2 of FIG. 3D shows the Q data string and the I data string when the Q data string is shifted by +2 bits and then the polarity of the I data string is inverted, Table E3 of FIG. 3D shows the Q data string and the I data string when the Q data string is shifted by +2 bits and then the polarity of the Q data string is inverted, and Table E4 of FIG. 3D shows the Q data string and the I data string when the Q data string is shifted by +2 bits and then the polarities of both the data strings are inverted. In addition, Table e1 of FIG. 3D shows the Q data string and the I data string when the lane swapping is further performed in the case shown in Table E1 of FIG. 3D, Table e2 of FIG. 3D shows the Q data string and the I data string when the lane swapping is further performed in the case shown in Table E2 of FIG. 3D, Table e3 of FIG. 3D shows the Q data string and the I data string when the lane swapping is further performed in the case shown in Table E3 of FIG. 3D, and Table e4 of FIG. 3D shows the Q data string and the I data string when the lane swapping is further performed in the case shown in Table E4 of FIG. 3D.

FIGS. 3A to 3E illustrate cases where pattern changing is performed in the order of the bit shifting, the polarity inversion, and the lane swapping. As apparent from the figures, the lane swapping results in the same data string as the data string obtained when the Q lane is shifted by −1 bit. Therefore, the data pattern obtained by shifting ±1 bit overlap the data obtained without shifting or by shifting ±2 bits, and hence the pattern checking may be omitted. To the contrary, when the lane swapping is omitted and bit shifting is performed by 0 bits, ±1 bit, and ±2 bits, it is also possible to omit the pattern checking and quickly verify the combination of the bit shifting and the pattern changing that correctly regenerates the data string.

For example, both in the case of Table A2 of FIG. 3A and in the case of Table b2 of FIG. 3A, when the I data string and the Q data string are multiplexed, the data array becomes "4, 1inv, 6, 3inv, 8, 5inv, 10, 7inv". Therefore, both in the case where the bit shift circuit 36 and the pattern changing circuit 37 are controlled with the control content that "the Q data string is shifted by −2 bits and the polarity of the I data string is inverted" and in the case where the bit shift circuit 36 and the pattern changing circuit 37 are controlled with the control content that "the Q data string is shifted by −1 bit, the polarity of the I data string is inverted, and the lane swapping is performed", the same data string is obtained after the multiplexing. Therefore, the bit shift pattern change control circuit 41 controls the bit shift circuit 36 and the pattern changing circuit 37 with only one of the control contents. In the case of this embodiment, the bit shift pattern change control circuit 41 performs bit shifting so that the bit shift amount is an even number of bits. Therefore, the bit shift pattern change control circuit 41 controls the bit shift circuit 36 and the pattern changing circuit 37 with the control content that "the Q data string is shifted by −2 bits and the polarity of the I data string is inverted", but does not control the bit shift circuit 36 and the pattern changing circuit 37 with the control content that "the Q data string is shifted by −1 bit, the polarity of the I data string is inverted, and the lane swapping is performed". Note that, the bit shift pattern change control circuit 41 may perform bit shifting so that the bit shift amount is an odd number of bits instead of an even number of bits.

Also, for example, both in the case of Table B2 of FIG. 3B and in the case of Table c2 of FIG. 3B, when the I data string and the Q data string are multiplexed, the data array becomes "2, 1inv, 4, 3inv, 6, 5inv, 8, 7inv, 10, 9inv". Therefore, the bit shift pattern change control circuit 41 controls the bit shift circuit 36 and the pattern changing circuit 37 with the control content that "the polarity of the I data string is inverted and the lane swapping is performed", but does not control the bit shift circuit 36 and the pattern changing circuit 37 with the control content that "the Q data string is shifted by −1 bit and the polarity of the I data string is inverted". Further, for example, both in the case of Table C2 of FIG. 3C and in the case of Table d2 of FIG. 3C, when the I data string and the Q data string are multiplexed, the data array becomes "1inv, 2, 3inv, 4, 5inv, 6, 7inv, 8, 9inv, 10". Therefore, the bit shift pattern change control circuit 41 controls the bit shift circuit 36 and the pattern changing circuit 37 with the control content that "the polarity of the I data string is inverted", but does not control the bit shift circuit 36 and the pattern changing circuit 37 with the control content that "the Q data string is shifted by +1 bit, the polarity of the I data string is inverted, and the lane swapping is performed". Also, for example, both in the case of Table D2 of FIG. 3D and in the case of Table e2 of FIG. 3D, when the I data string and the Q data string are multiplexed, the data array becomes "3inv, 2, 5inv, 4, 7inv, 6, 9inv, 8". Therefore, the bit shift pattern change control circuit 41 controls the bit shift circuit 36 and the pattern changing circuit 37 with the control content that "the Q data string is shifted by +2 bits, the polarity of the I data string is inverted, and the lane swapping is performed", but does not control the bit shift circuit 36 and the pattern changing circuit 37 with the control content that "the Q data string is shifted by +1 bit and the polarity of the I data string is inverted".

Hereinabove, referring to FIGS. 1, 2, and 3A to 3D, there has been exemplified the checking method in the case where the pattern changing is performed in the order of the bit shifting, the polarity inversion, and the lane swapping. When the order is changed, the combinations of overlapping control contents change, but the number of the combinations is the same. FIGS. 4A to 4E illustrate arrangements and polarities of the two data strings in the I and Q lanes when the pattern changing is performed in the order of the polarity inversion, the lane swapping, and the bit shifting, in the manner similar to FIGS. 3A to 3D.

Table a1 of FIG. 4A shows the I data string and the Q data string when the lane swapping is performed and then the Q data string is shifted by −2 bits, Table a2 of FIG. 4A shows the I data string and the Q data string when the lane swapping is performed, and then the polarity of the Q data string is inverted and the Q data string is shifted by −2 bits, Table a3 of FIG. 4A shows the I data string and the Q data string when the lane swapping is performed, and then the polarity of the I data string is inverted and the Q data string is shifted by −2 bits, and Table a4 of FIG. 4A shows the I data string and the Q data string when the lane swapping is performed, and then the polarities of both the data strings are inverted and the Q data string is shifted by −2 bits. Table A1 of FIG. 4A shows the I data string and the Q data string when the Q data string is shifted by −2 bits, Table A2 of FIG. 4A shows the I data string and the Q data string when the polarity of the I data string is inverted and then the Q data string is shifted by −2 bits, Table A3 of FIG. 4A shows the I data string and the Q data string when the polarity of the Q data string is inverted and then the Q data string is shifted by −2 bits, and Table A4 of FIG. 4A shows the I data string and the Q data string when the polarities of both the data strings are inverted and then the Q data string is shifted by −2 bits.

Table b1 of FIG. 4B shows the I data string and the Q data string when the lane swapping is performed and then the Q data string is shifted by −1 bit, Table b2 of FIG. 4B shows the I data string and the Q data string when the lane swapping is performed, and then the polarity of the Q data string is inverted and the Q data string is shifted by −1 bit, Table b3 of FIG. 4B shows the I data string and the Q data string when the lane swapping is performed, and then the polarity of the I data string is inverted and the Q data string is shifted by −1 bit, and Table b4 of FIG. 4B shows the I data string and the Q data string when the lane swapping is performed, and then the polarities of both the data strings are inverted and the Q data string is shifted by −1 bit. Table B1 of FIG. 4B shows the I data string and the Q data string when the Q data string is shifted by −1 bit, Table B2 of FIG. 4B shows the I data string and the Q data string when the polarity of the I data string is inverted and then the Q data string is shifted by −1 bit, Table B3 of FIG. 4B shows the I data string and the Q data string when the polarity of the Q data string is inverted and then the Q data string is shifted by −1 bit, and Table B4 of FIG. 4B shows the I data string and the Q data string when the polarities of both the data strings are inverted and then the Q data string is shifted by −1 bit.

Table c1 of FIG. 4C shows the I data string and the Q data string when the lane swapping is performed, Table c2 of FIG. 4C shows the I data string and the Q data string when the lane swapping is performed and then the polarity of the Q data string is inverted, Table c3 of FIG. 4C shows the I data string and the Q data string when the lane swapping is performed and then the polarity of the I data string is inverted, and Table c4 of FIG. 4C shows the I data string and the Q data string when the lane swapping is performed and then the polarities of both the data strings are inverted. Table C1 of FIG. 4C shows the I data string and the Q data string when the Q data string is shifted by 0 bits, Table C2 of FIG. 4C shows the I data string and the Q data string when the polarity of the I data string is inverted, Table C3 of FIG. 4C shows the I data string and the Q data string when the polarity of the Q data string is inverted, and Table C4 of FIG. 4C shows the I data string and the Q data string when the polarities of both the data strings are inverted.

Figure 4D:
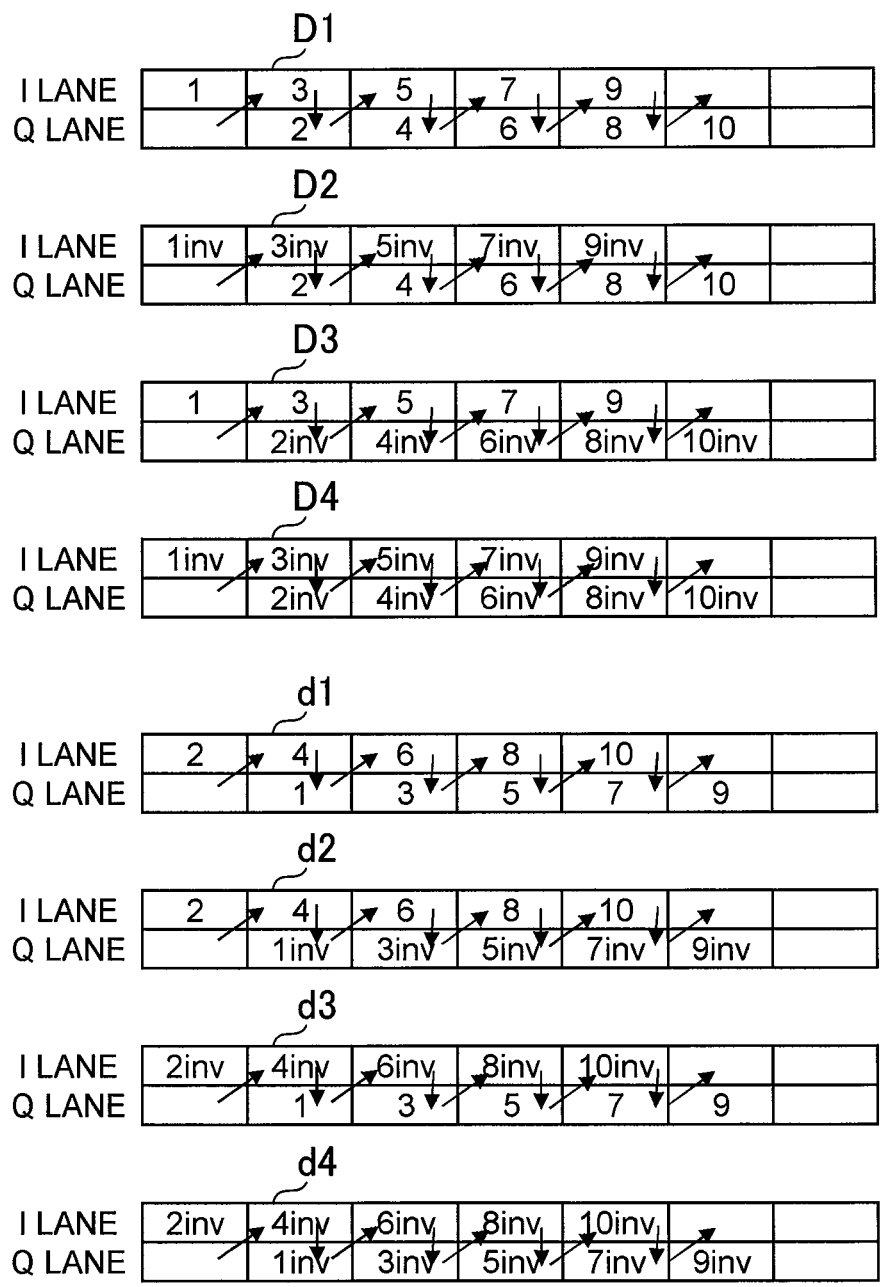
FIG. 4D is a diagram illustrating changes of the I data string and the Q data string.

Table d1 of FIG. 4D shows the I data string and the Q data string when the lane swapping is performed and then the Q data string is shifted by +1 bit, Table d2 of FIG. 4D shows the I data string and the Q data string when the lane swapping is performed, and then the polarity of the Q data string is inverted and the Q data string is shifted by +1 bit, Table d3 of FIG. 4D shows the I data string and the Q data string when the lane swapping is performed, and then the polarity of the I data string is inverted and the Q data string is shifted by +1 bit, and Table d4 of FIG. 4D shows the I data string and the Q data string when the lane swapping is performed, and then the polarities of both the data strings are inverted and the Q data string is shifted by +1 bit. Table D1 of FIG. 4D shows the I data string and the Q data string when the Q data string is shifted by +1 bit, Table D2 of FIG. 4D shows the I data string and the Q data string when the polarity of the I data string is inverted and then the Q data string is shifted by +1 bit, Table D3 of FIG. 4D shows the I data string and the Q data string when the polarity of the Q data string is inverted and then the Q data string is shifted by +1 bit, and Table D4 of FIG. 4D shows the I data string and the Q data string when the polarities of both the data strings are inverted and then the Q data string is shifted by +1 bit.

Table e1 of FIG. 4E shows the I data string and the Q data string when the lane swapping is performed and then the Q data string is shifted by +2 bits, Table e2 of FIG. 4E shows the I data string and the Q data string when the lane swapping is performed, and then the polarity of the Q data string is inverted and the Q data string is shifted by +2 bits, Table e3 of FIG. 4E shows the I data string and the Q data string when the lane swapping is performed, and then the polarity of the I data string is inverted and the Q data string is shifted by +2 bits, and Table e4 of FIG. 4E shows the I data string and the Q data string when the lane swapping is performed, and then the polarities of both the data strings are inverted and the Q data string is shifted by +2 bits. Table E1 of FIG. 4E shows the I data string and the Q data string when the Q data string is shifted by +2 bits, Table E2 of FIG. 4E shows the I data string and the Q data string when the polarity of the I data string is inverted and then the Q data string is shifted by +2 bits, Table E3 of FIG. 4E shows the I data string and the Q data string when the polarity of the Q data string is inverted and then the Q data string is shifted by +2 bits, and Table E4 of FIG. 4E shows the I data string and the Q data string when the polarities of both the data strings are inverted and then the Q data string is shifted by +2 bits.

In this case, bit shifting to the negative side has overlapping patterns (control contents) in no bit shifting and bit shifting in the positive side. Specifically, the data string obtained when the I data string and the Q data string are multiplexed is the same for the case of Table A1 of FIG. 4A and the case of Table d1 of FIG. 4D, for the case of Table A2 of FIG. 4A and the case of Table d2 of FIG. 4D, for the case of Table A3 of FIG. 4A and the case of Table d3 of FIG. 4D, for the case of Table A4 of FIG. 4A and the case of Table d4 of FIG. 4D, for the case of Table a1 of FIG. 4A and the case of Table D1 of FIG. 4D, for the case of Table a2 of FIG. 4A and the case of Table D2 of FIG. 4D, for the case of Table a3 of FIG. 4A and the case of Table D3 of FIG. 4D, and for the case of Table a4 of FIG. 4A and the case of Table D4 of FIG. 4D. Similarly, the data string obtained when the I data string and the Q data string are multiplexed is the same for the case of Table B1 of FIG. 4B and the case of Table c1 of FIG. 4C, for the case of Table B2 of FIG. 4B and the case of Table c2 of FIG. 4C, for the case of Table B3 of FIG. 4B and the case of Table c3 of FIG. 4C, for the case of Table B4 of FIG. 4B and the case of Table c4 of FIG. 4C, for the case of Table b1 of FIG. 4B and the case of Table C1 of FIG. 4C, for the case of Table b2 of FIG. 4B and the case of Table C2 of FIG. 4C, for the case of Table b3 of FIG. 4B and the case of Table C3 of FIG. 4C, and for the case of Table b4 of FIG. 4B and the case of Table C4 of FIG. 4C. Therefore, verification of the bit shifting on the side of the bit shifting on the negative side becomes unnecessary. In this case also, the number of combinations of omittable patterns (control contents) when the verification is performed to a certain bit shift value is the same.

Note that, embodiments of the present invention are not limited to the embodiment described above. For example, the present invention is applicable not only to the case where the signal conduction is to be established in the optical receiver including the two CDR circuits, but also to a case where the signal conduction is to be established in an optical receiver including at least two CDR circuits. Specifically, the present invention is applicable not only to the case where the signal conduction is to be established by multiplexing the two data strings regenerated by the two CDR circuits, but also to a case where the signal conduction is to be established by multiplexing at least two data strings regenerated by at least two CDR circuits.

While there have been described what are at present considered to be certain embodiments of the invention, it will be understood that various modifications may be made thereto, and it is intended that the appended claims cover all such modifications as fall within the true spirit and scope of the invention.

What is claimed is:

1. An optical receiver for receiving an optical signal that has been subjected to quadrature phase modulation, comprising:
    at least two independent CDR circuits for clock extraction, identification and data regeneration of at least two electric signals regenerated from the received optical signal that has been subjected to the quadrature phase modulation;
    a synchronization circuit to synchronize at least two first data strings respectively output from the CDR circuits;
    a bit shift circuit to bit shift at least one of at least two second data strings output from the synchronization circuit;
    a pattern changing circuit to lane swap and polarity invert at least one of the at least two second data strings output from the bit shift circuit;
    a multiplexing circuit to multiplex at least two third data strings output from the pattern changing circuit;
    a signal check circuit to verify multiplexed data output from the multiplexing circuit; and
    a bit shift pattern change control circuit connected to control the bit shift circuit and the pattern changing circuit based on a result of data verification from the signal check circuit, detect a correct combination of correct regenerated data, and establish signal conduction,
    wherein the bit shift pattern change circuit repeatedly changes control contents of the bit shift circuit and the pattern changing circuit until the result of the data verification output from the signal check circuit becomes a predetermined result, and detects the correct combination of the correct regenerated data to establish signal conduction,
    wherein, when multiplexed data output from the multiplexing circuit in a case where the bit shift circuit and the pattern changing circuit are controlled with a first control content and multiplexed data output from the multiplexing circuit in a case where the bit shift circuit and the pattern changing circuit are controlled with a second control content are the same, the bit shift pattern change control circuit controls the bit shift circuit and the pattern changing circuit with one of the first control content or the second control content, and
    wherein the bit shift pattern change control circuit controls so as to verify one of an odd number of bits or an even number of bits among the multiplexed data.

2. An optical receiver for receiving an optical signal that has been subjected to quadrature phase modulation, comprising:
    two independent CDR circuits for clock extraction, identification and data regeneration of two electric signals regenerated from the received optical signal that has been subjected to the quadrature phase modulation;
    a synchronization circuit to synchronize two first data strings respectively output from the two independent CDR circuits;
    a bit shift circuit to bit shift one of two second data strings output from the synchronization circuit;
    a pattern changing circuit to lane swap and polarity invert one of the two second data strings output from the bit shift circuit;
    a multiplexing circuit to multiplex two third data strings output from the pattern changing circuit;
    a signal check circuit to verify multiplexed data output from the multiplexing circuit; and
    a bit shift pattern change control circuit to control the bit shift circuit and the pattern changing circuit based on a result of the data verification output from the signal check circuit, detect a correct combination of correct regenerated data, and establish signal conduction,
    wherein the bit shift pattern change control circuit repeatedly changes control contents of the bit shift circuit and the pattern changing circuit until the result of the data verification output from the signal check circuit becomes a predetermined result, and detects the correct combination of the correct reproduction data to establish the signal conduction,
    wherein the bit shift pattern change control circuit controls the bit shift circuit to set a bit shift amount used to bit shift the one of the two data strings to one of an even number of bits or an odd number of bits, and
    wherein the bit shift pattern change control circuit controls so as to verify an odd number of bits or an even number of bits among the multiplexed data.

3. The optical receiver according to claim 1, wherein the bit shift pattern change control circuit controls so as to verify data which consist of the bit shift of the multiplexed data, the polarity inversion of the multiplexed data, and the bit shift and the polarity inversion of the multiplexed data.

4. An optical receiver for receiving an optical signal that has been subjected to quadrature phase modulation, comprising:
    at least two independent CDR circuits for extracting clock and identifying and regenerating data from a regenerated electric signal;
    a synchronization circuit for synchronizing outputs of the at least two independent CDR circuits;
    a circuit including a bit shift circuit having a bit shifting function and a pattern changing circuit having a lane swapping function and a polarity inversion function;
    a multiplexing circuit for multiplexing at least two of first data strings;

a signal check circuit for performing data verification of multiplexed data output from the multiplexing circuit; and a bit shift pattern change control circuit having functions of controlling the bit shift circuit and the pattern changing circuit based on a result of the data verification output from the signal check circuit, detecting a correct combination of correct regenerated data, and establishing signal conduction, wherein at least two electric signals regenerated from the optical signal that has been subjected to the quadrature phase modulation are input to the at least two independent CDR circuits, respectively, wherein at least two second data strings output from the at least two independent CDR circuits, respectively, are input to the synchronization circuit, wherein at least two third data strings output from the synchronization circuit are input to the circuit, wherein the multiplexing circuit multiplexes the at least two first data strings output via the circuit, wherein the bit shift pattern change control circuit repeatedly changes control contents of the bit shift circuit and the pattern changing circuit until the result of the data verification output from the signal check circuit becomes a predetermined result, and detects the correct combination of the correct regenerated data to establish the signal conduction, and wherein, when multiplexed data output from the multiplexing circuit in a case where the bit shift circuit and the pattern changing circuit are controlled with a first control content and multiplexed data output from the multiplexing circuit in a case where the bit shift circuit and the pattern changing circuit are controlled with a second control content are the same, the bit shift pattern change control circuit controls the bit shift circuit and the pattern changing circuit with one of the first control content or the second control content.

* * * * *